Feb. 3, 1959      M. A. WACHS      2,872,227

RIGID SHAFT COUPLING

Filed July 25, 1956

INVENTOR
MILLER A. WACHS
BY
AGENT

United States Patent Office 2,872,227
Patented Feb. 3, 1959

2,872,227

RIGID SHAFT COUPLING

Miller A. Wachs, Stratford, Conn., assignor to United Aircraft Corporation, East Hartford, Conn., a corporation of Delaware Application July 25, 1956, Serial No. 600,014

4 Claims. (Cl. 287—119)

This invention relates to a rigid coupling for securing one tubular shaft to another for transmitting torque therebetween. This invention is particularly useful in the tail rotor drive of a helicopter where thin walled tubular drive shafts are involved.

An object of this invention is to rigidly connect or lock two thin walled shafts together without creating any loading in a radial direction on the sides of the tubes thereby decreasing the possibility of deforming the walls.

Another object of this invention is to provide a connecting means having a locking device for connecting a tubular drive shaft to a tubular shaft to be driven which extends through holes in the tubes lined up on a diametrical axis.

A further object of this invention is to provide a means for rigidly connecting two thin walled shafts in which two locking devices extend through both of the shafts and are positioned with their axes at an angle of 90° to each other.

Another object of this invention is to provide a connecting means for two thin walled shafts which does not involve intricate machining and assembly problems.

A further object of this invention is to provide a locking device having a split collar in which the open section or split is located facing the end of the shafts to be connected.

Other objects and advantages will be apparent from the specification and from the accompanying drawings which illustrate the invention.

Figure 1:
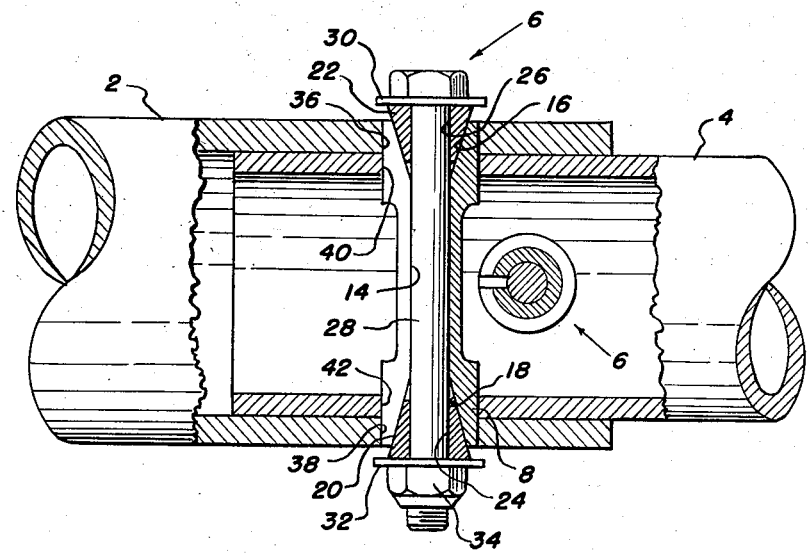
Fig. 1 is a view showing two ends of thin walled shafts partially in section with the locking device shown in section.
Figure 4:
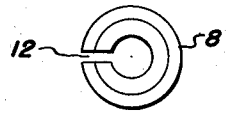
Fig. 4 is an end view of the split collar.
Figure 2:
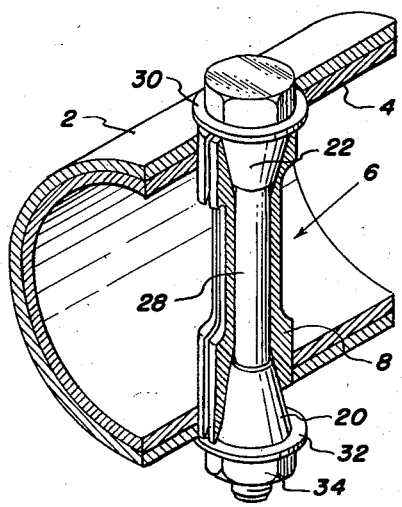
Fig. 2 is a perspective view of one of the locking devices.
Figure 3:
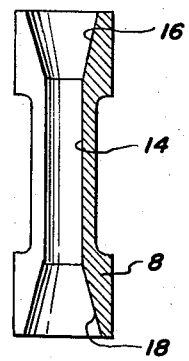
Fig. 3 is a sectional view of the split collar of the locking device.

In Fig. 1 a driving thin walled shaft 2 has a second thin walled shaft 4 to be driven thereby positioned therein in telescoping relation. Two locking devices 6 are shown rigidly connecting the thin walled shafts 2 and 4 so that torque may be transmitted therebetween.

Each locking device 6 comprises a split collar, or sleeve 8 having an opening, or passageway, extending therethrough which has a section 14 of constant cross section for a portion of its length and an outwardly tapering section 16 and 18 on each end.

Two frustoconical members 20 and 22 are arranged one each to be positioned with one end within one of the outwardly tapering sections 16 or 18. The taper on the frustoconical members matches the taper on the sections into which they fit. An opening, or passageway, 24 extends through the member 20 and is aligned coaxially with section 14 of the split collar 8 when the member 20 is properly positioned in respect to the collar.

An opening, or passageway, 26 extends through the member 22 and is aligned coaxially with section 14 of the split collar 8 when the member 22 is properly positioned in respect to the collar.

These three elements of the locking device 6, the split collar 8 and the members 20 and 22, are held together by a bolt 28 which passes through the passageways 24 and 26 and the constant section 14. Washers 30 and 32 are positioned against each outwardly facing end of members 20 and 22, respectively. A nut 34 maintains the bolt in place.

Preparatory to connecting the ends of two thin walled shafts together, the ends of the shafts have two sets of holes drilled therein diametrically perpendicular to each other. These holes may be cylindrical, that is, nontapered. As shown in Fig. 1, the thin walled shaft 2 has one set of holes 36 and 38 in such a position and the thin walled shaft 4 has one set of holes 40 and 42 in a like position. Each respective washer, 30 and 32, has a diameter greater than the diameter of the hole of the thin walled shaft adjacent it. The other set of holes is positioned on an axis 90° to the axis of the first set of holes. These holes are shown in Fig. 1 to the right of the locking device shown in section.

Assembly

In rigidly connecting or locking two thin walled shafts together, the end of one shaft is placed within the end of the other with the two sets of holes in one shaft positioned over the mating holes of the other shaft forming two through openings or the hole could be drilled after the shafts are positioned. Taking one through opening, a split collar or sleeve 8 is placed within said opening, said collar being of a length equal to the outer diameter of the larger thin walled shaft. Each end of the collar is of such a dimension so as to snugly engage the openings formed by the two thin walled shafts, that is, the opening formed by mating holes 36 and 40 and the opening formed by mating holes 38 and 42. The members 20 and 22 are then placed within the tapering sections 16 and 18 respectively. The washers 30 and 32 are then held in place and the bolt 28 is extended through the washers 30 and 32, members 20 and 22 and the split collar 8. A nut is placed on the threaded end of the bolt. The same procedure is followed concerning the other through opening at 90° to the one referred to above. The final step is the tightening of each bolt 28.

It can be seen that as a bolt is tightened the cooperating tapered members 20 and 22 are forced toward each other causing the split collar to expand in a radial direction. This expansion is transmitted to the thin walled shafts through their wall thereby furnishing an intimate metal to metal contact for transmitting torque.

I claim:

1. In combination with two thin walled shafts a connecting device for transmitting torque between said shafts, one end of one shaft being telescopically positioned within one end of the other shaft forming overlapping ends, each of said overlapping ends having a set of holes positioned on a diametrical axis, said overlapping ends having their sets of holes coaxially aligned, said connecting device comprising a split collar, said collar having a length equal to the outer diameter of the outer shaft, said collar having each end of circular cross section with the diameter being slightly less than the diameter of the aligned holes in the thin walled shafts, said collar being positioned along the axis of the coaxially aligned sets of holes with a portion adjacent its ends positioned within the holes, the split in said collar lying in a plane extending through the axis of said thin walled shafts, said collar having an outwardly tapering opening at each end, a tapered member being positioned in each tapered opening, and means for moving said tapered members axially of said collar, said tapered members opening said collar equally in a radial direction when they are moved toward each other to expand said collar to tightly engage said shafts around said holes, said two shafts being rigidly fixed axially with respect to one another at the location of said split collar, said two shafts also being rigidly fixed against rotation with respect to one another at the location of said split collar.

2. In combination with two thin walled shafts a connecting device for transmitting torque between said shafts, one end of one shaft being telescopically positioned within one end of the other shaft forming overlapping ends, each of said overlapping ends having a set of holes positioned on a diametrical axis, said overlapping ends having their sets of holes coaxially aligned, said connecting device comprising a split collar, said collar having a length equal to the outer diameter of the outer shaft, said collar having each end of circular cross section with the diameter being slightly less than the diameter of the aligned holes in the thin walled shafts, said collar being positioned along the axis of the coaxially aligned sets of holes with a portion adjacent its ends positioned within ends positioned within the holes, said collar having an outwardly tapering opening at each end, a tapered member being positioned in each tapered opening, each tapered member having an opening therethrough, said last named openings being aligned with the opening through said collar, a washer being located over the outer end of each tapered member, and a bolt extending through said washers, tapered members and collar for moving said tapered members axially of said collar, each washer having a diameter larger than the adjacent hole through said thin walled shafts, said tapered members opening said collar equally in a radial direction when they are moved toward each other to expand said collar to tightly engage said shafts around said holes, said two shafts being rigidly fixed axially with respect to one another at the location of said split collar, said two shafts also being rigidly fixed against rotation with respect to one another at the location of said split collar.

3. In combination with two thin walled shafts a connecting means for transmitting torque between said shafts, one end of one shaft being telescopically positioned within one end of the other shaft forming overlapping ends, each of said overlapping ends having two sets of holes positioned on a diametrical axis, said diametrical axes being positioned 90° from each other, said overlapping ends having both of their sets of holes coaxially aligned, said connecting means having two locking devices, one locking device being located in each coaxially aligned set of holes, each locking device comprising a split collar, said collar having a length equal to the outer diameter of the outer shaft, said collar having each end of circular cross section with the diameter being slightly less than the diameter of the aligned holes in the thin walled shafts, said collar being positioned along the axis of the cooperating coaxially aligned sets of holes with a portion adjacent each end positioned within the holes, said collar having an outwardly tapering opening at each end, a tapered member being positioned in each tapered opening, and means for moving said tapered members axially of said collar, said tapered members opening said collar equally in a radial direction when they are moved toward each other to expand said collar to tightly engage said shafts around said holes, said two shafts being rigidly fixed axially with respect to one another at the location of each of said split collars, said two shafts also being rigidly fixed against rotation with respect to one another at the location of each of said split collars.

4. In combination with two thin walled shafts a connecting means for transmitting torque between said shafts, one end of one shaft being telescopically positioned within one end of the other shaft forming overlapping ends, each of said overlapping ends having two sets of holes positioned on a diametrical axis, said diametrical axes being positioned 90° from each other, said overlapping ends having both of their sets of holes coaxially aligned, said connecting means having two locking devices, one locking device being located in each coaxially aligned set of holes, each locking device comprising a split collar, said collar having a length equal to the outer diameter of the outer shaft, said collar having each end of circular cross section with the diameter being slightly less than the diameter of the aligned holes in the thin walled shafts, said collar being positioned along the axis of the cooperating coaxially aligned sets of holes with a portion adjacent each end positioned within the holes, the split in said collar lying in a plane extending through the axis of said thin walled shafts, said collar having an outwardly tapering opening at each end, a tapered member being positioned in each tapered opening, and means for moving said tapered members axially of said collar, said tapered members opening said collar equally in a radial direction when they are moved toward each other to expand said collar to tightly engage said shafts around said holes, said two shafts being rigidly fixed axially with respect to one another at the location of each of said split collars, said two shafts also being rigidly fixed against rotation with respect to one another at the location of each of said split collars.

References Cited in the file of this patent

UNITED STATES PATENTS

| 604,981 | Guy | May 31, 1898 |
| 1,120,368 | Booraem | Dec. 8, 1914 |
| 1,467,060 | Munning | Sept. 4, 1923 |
| 1,711,725 | Edwards et al. | May 7, 1929 |
| 1,922,099 | Kilian | Aug. 15, 1933 |

FOREIGN PATENTS

| 607,462 | France | July 2, 1926 |